United States Patent [19]
Si et al.

[11] Patent Number: 5,612,824
[45] Date of Patent: Mar. 18, 1997

[54] NARROW BAND FILTER AND METHOD OF MAKING SAME

[75] Inventors: Y. Calvin Si; Gary S. Duck, both of Nepean; Joseph Ip, Kanata; Neil Teitelbaum, Ottawa, all of Canada

[73] Assignee: JDS Fitel Inc., Nepean, Canada

[21] Appl. No.: 442,365

[22] Filed: May 16, 1995

[30] Foreign Application Priority Data

Apr. 10, 1996 [CA] Canada ................................. 2146738

[51] Int. Cl.$^6$ .................................................. G02B 6/18
[52] U.S. Cl. ........................................ 359/652; 385/124
[58] Field of Search ................................. 359/652, 653, 359/654; 385/124

[56] References Cited

U.S. PATENT DOCUMENTS 5,050,954  9/1991  Gardner et al. .
5,054,018  10/1991  Tremblay .
5,076,672  12/1991  Tsuda et al. .
5,453,827  9/1995  Lee .
5,459,605  10/1995  Kempf .

*Primary Examiner*—Scott J. Sugarman
*Attorney, Agent, or Firm*—Neil Teitelbaum & Associates

[57] ABSTRACT

An optical filter is provided having first and second graded index (GRIN) lenses preferably disposed in a coaxial relationship so that they have a common optical axis. Each of the GRIN lenses have an endface providing a port at predetermined location. The ports are disposed on opposite sides of the optical axis and each of the ports are substantially equidistant from the optical axis, so as to be oppositely offset from the optical axis by a same amount. The filter also includes an optical interference filter disposed between other endfaces of the first and second graded index lenses. By changing the location of the ports by a same small amount, the center wavelength of the filter changes by a small amount, thus in manufacture, the filter is tunable. After tuning the filter to a desired wavelength, the locations of the ports are fixed.

4 Claims, 3 Drawing Sheets

PRIOR ART

FIG. 3g
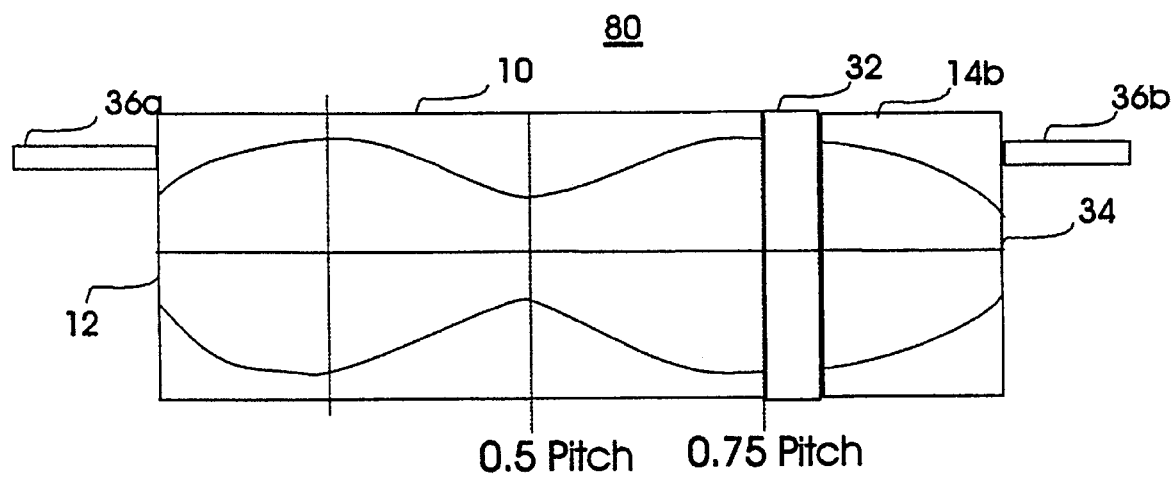
0.5 Pitch   0.75 Pitch
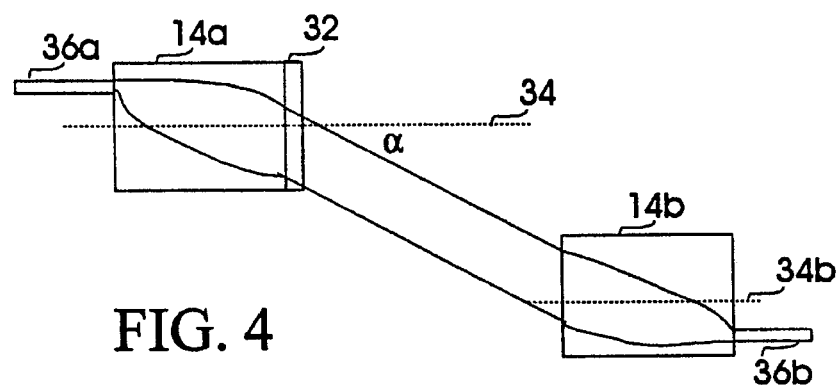
FIG. 4

NARROW BAND FILTER AND METHOD OF MAKING SAME

FIELD OF THE INVENTION

This invention relates to optical filters and more particularly, to narrow band-pass optical filter and method of fabrication.

BACKGROUND OF THE INVENTION

There have been many attempts to develop compact, high precision, low tolerance narrow band optical filters centered at predetermined wavelengths for application in areas such as spectroscopy, optical networks and optical links, and more particularly optical communication systems. Optical filters are some of the most ubiquitous of all passive optical components found in most optical communication systems. One use of optical filters is in the field of optical communications where only a signal of a predetermined wavelength is to be passed.

Narrow band optical filters which pass only a very narrow band of light (e.g. ±0.2 nanometers or less) and centered at a predetermined wavelength, are extremely difficult to make and consequently relatively expensive to manufacture. As of late, there has been a demand for a plurality of such filters having a wavelength separation of less than 2 nanometers. One known means for providing a selective narrow band optical filter, is by utilizing a wavelength selective interference filter element whose wavelength characteristic depends on the angle of incidence. Thus, by varying the angle of light incident upon the interference filter, the wavelength of the light that is passed by the filter varies. Such a filter element is described in U.S. Pat. No. 5,331,651 issued Jul. 19, 1994 and assigned to the Hewlett-Packard Company. Often, these filter elements are used in free-space configurations, wherein a beam of light exiting an optical fiber or other waveguide is directed through free space into a wavelength selective interference filter element at a predetermined angle; however, many such configurations have limitations. For example, positioning and affixing an optical fiber in a predetermined position and at a predetermined angle relative to a filter element can be challenging.

Thus, it is an object of this invention, to provide an integrated narrow band-pass filter and method of making a filter, which overcomes many of the limitations in prior art devices, and, wherein the device is compact, centered at a predetermined frequency, and has a tolerance that is within very small predetermined limits.

It is a further object of the invention to provide a method of tuning a filter to obtain a wavelength selective filter that is compact and centered at a predetermined frequency within very small predetermined limits.

SUMMARY OF THE INVENTION

In accordance with the invention, an optical filter is provided comprising first and second graded index lenses disposed in a coaxial relationship, the lenses having a common optical axis. Each of the lenses have an endface providing a port at predetermined location. The ports are disposed on opposite sides of the optical axis; each of the ports is substantially equidistant from the optical axis, so as to be oppositely offset from the optical axis by a same amount. The filter also includes wavelength selective means disposed between the other endfaces of the first and second graded index lenses; the wavelength selective means have a wavelength characteristic dependent upon on an angle of incidence for transmitting light of a predetermined wavelength and reflecting other wavelengths.

BRIEF DESCRIPTION OF THE DRAWINGS

Exemplary embodiments of the invention will be described in conjunction with the drawings in which:

FIG. 3g is an illustration of an alternative embodiment of the bandpass filter having input and output ports an a same side of the optical axis; and, FIG. 4 is an illustration of an alterative embodiment of the bandpass filter shown in FIG. 3a.

DETAILED DESCRIPTION

Figure 1:
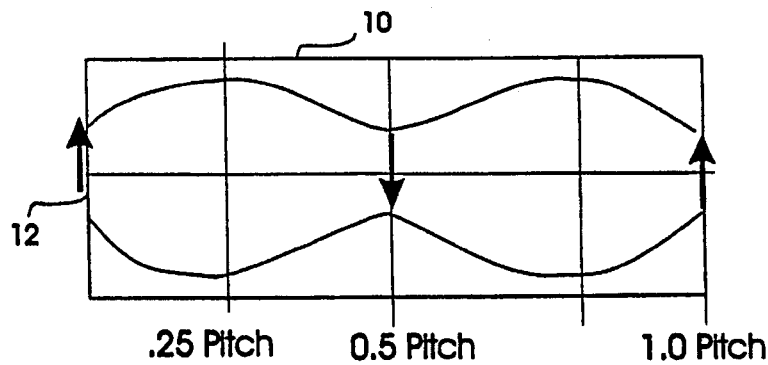
FIG. 1 is an illustration prior art graded index (GRIN) lens showing the principles of operation.

In the following description, it should be understood that same elements shown in different figures are assigned same reference numerals. Referring now to FIG. 1, a 1.0 pitch GRIN lens 10 is shown having an input beam represented by an upright arrow at an input endface 12 of the lens 10. Fiber lenses of this type are produced under the trade name "SELFOC"; the mark is registered in Japan and owned by the Nippon Sheet and Glass Co. Ltd. At a location along the lens, indicated as 0.25 pitch, the input beam becomes collimated. At the 0.5 pitch location midway between the endfaces of the lens 10, the input beam becomes inverted. This phenomenon is further demonstrated in FIG. 2. However, two matched quarter pitch GRIN lenses 14a and 14b are disposed in a back to back relationship. Each GRIN lens is provided with a port which is a point or region along an endface of the lens for receiving or transmitting a beam of light. The beam shown by an upright arrow at the input port 12a of lens 14a is inverted at the output port 12b of the second GRIN lens 14b.

Figure 2A:
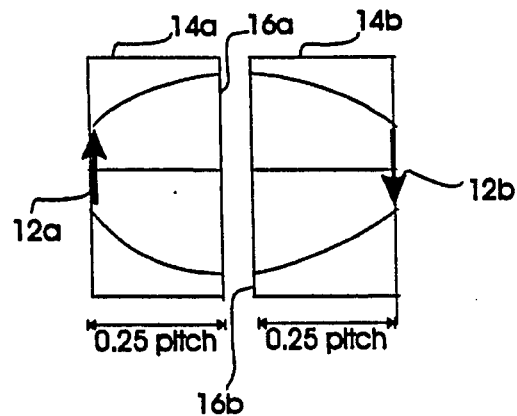
FIG. 2a is an illustration of two quarter pitch GRIN lenses illustrating their operation.
Figure 2B:
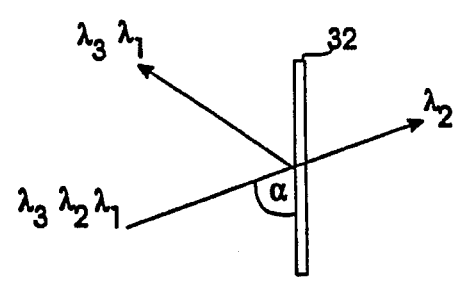
FIG. 2b is a filter dement having wavelength characteristics that vary with angle of incidence.

Turning now to FIG. 2b, a wavelength selective means 32 in the form of a narrow band interference filter, is shown; the interference filter 32 has a wavelength characteristic dependent upon on an angle $\alpha$ of incidence. In the figure an input beam of light comprised of three wavelengths $\lambda_1$, $\lambda_2$, and $\lambda_3$ is incident upon the filter 32. Since the filter passes a predetermined wavelength of light at a predetermined angle, in the example, $\lambda_1$ and $\lambda_3$ are reflected and $\lambda_2$ is passed through the filter 32. Of course, varying the angle of incidence $\alpha$ varies the wavelength of light passed, the filter reflecting other wavelengths outside of a very narrow band about the center wavelength. In attempting to manufacture a narrow band filter using the interference filter 32 shown in FIG. 2b, it is very difficult to accurately glue an optical fiber to an optical element such as a filter, at a predetermined angle. Furthermore, it is difficult to adjust and maintain the angle α in a controlled manner in the process of manufacturing a discrete component.

Figure 3A:
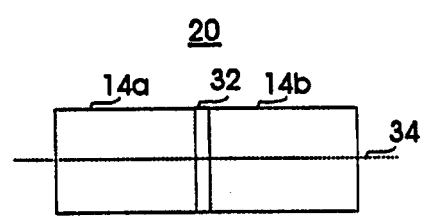
FIG. 3a is a side view of two quarter pitch GRIN lenses having a filter element disposed therebetween.
Figure 3B:
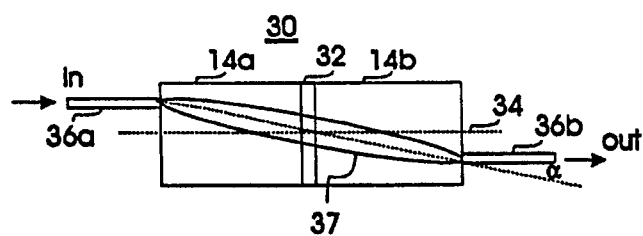
FIG. 3b is an illustration of a two port narrow bandpass filter in accordance with the invention.

In FIG. 3a, a optical filter 20 includes a first quarter pitch GRIN lens 14a and second GRIN lens 14b oriented as in FIG. 2. The GRIN lenses are disposed in a coaxial relationship having a common optical axis 34. A filter 32 is disposed between the inwardly facing endfaces of the first and second graded index lenses 14a and 14b. Light at the inwardly facing end faces at the filter 32 is collimated by the lenses. By placing a pair of waveguides, for example in the form of optical fibers at outward endfaces of the filter 30 (shown in FIG. 3b) input output ports 36a and 36b respectively are provided. As a result of the input beam being inverted by the GRIN lens 14a, an input beam launched into input port 36a on one side of the optical axis 34 propagates through the device 30 and exits the output port 36b on the other side of the optical axis. Thus, if the lenses 14a and 14b are symmetrical, it is necessary to ensure that the ports 36a and 36b juxtaposed on either side of the optical axis 34 are substantially equidistant from the optical axis. In one method of manufacture, one of the ports can be moved slowly toward or away from the optical axis 34 in a controlled manner until a detected output signal is at a maximum intensity. When the ports are adjusted sufficiently, or it is deemed that the light launched into the port 36a is focused onto the output port 36b, the filter 30 can be tuned to a desired wavelength within the physical limits of the filter 32. For example, when the two ports are adjusted as was described heretofore, the filter 30 will function as a narrow bandpass filter, passing a very narrow band of light having a spectral width that is within a predetermined maximum. Essentially, a signal having predetermined center wavelength and a variance from that predetermined wavelength of a predetermined small mount, will pass through the filter. For example, in one embodiment of this invention four filters are tuned, respectively, to pass 1550±0.2 nm, 1552±0.2 nm, 1554±0.2 nm, and 1556±0.2 nm. By displacing the fibers (i.e. ports 36a and 36b) a small same amount and direction, toward or away from the optical axis, the center frequency of the filter changes. As the fibers are displaced, moving further away from the optical axis, the wavelength of the narrow band filter 30 decreases, and thus, aligning the ports 36a and 36b with the optical axis will provide a filter with a maximum wavelength. In FIG. 3b a beam 37 is incident upon the filter 32 at an angle α. As the position of the ports is moved toward the optical axis the angle α decreases and the center wavelength increases.

Figure 3C:
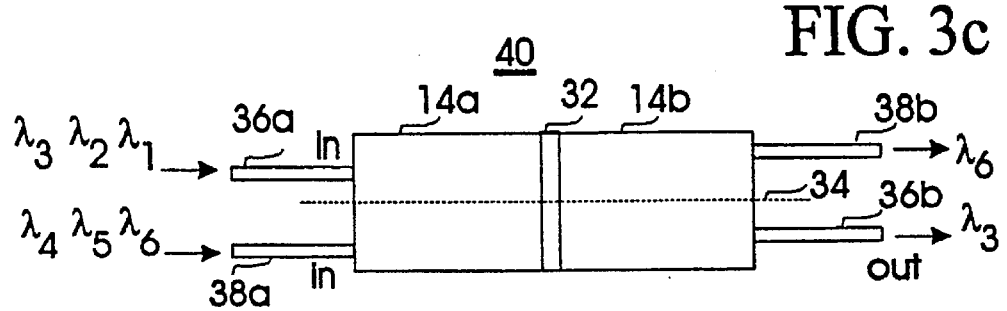
FIG. 3c is an illustration of a four port narrow bandpass filter in accordance with the invention.
Figure 3D:
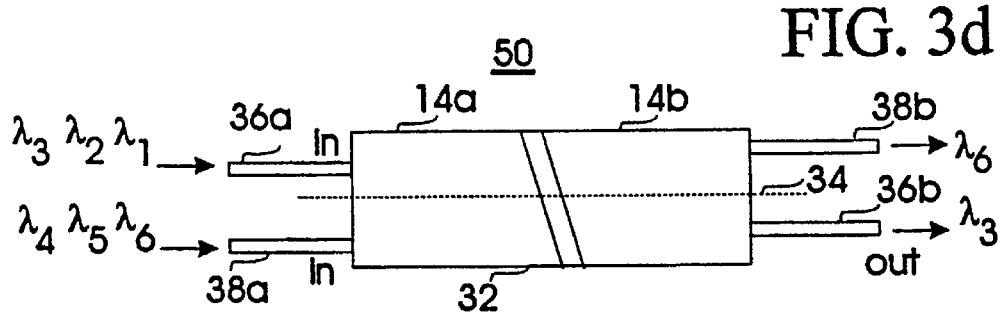
FIG. 3d is an illustration of an alternative embodiment of the bandpass filter shown in FIG. 3c.
Figure 3E:
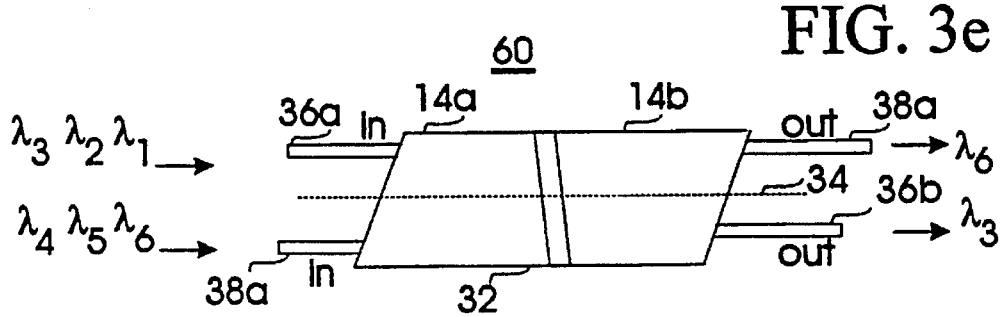
FIG. 3e is an illustration of an alternative embodiment of the bandpass filter shown in FIG. 3d.
Figure 3F:
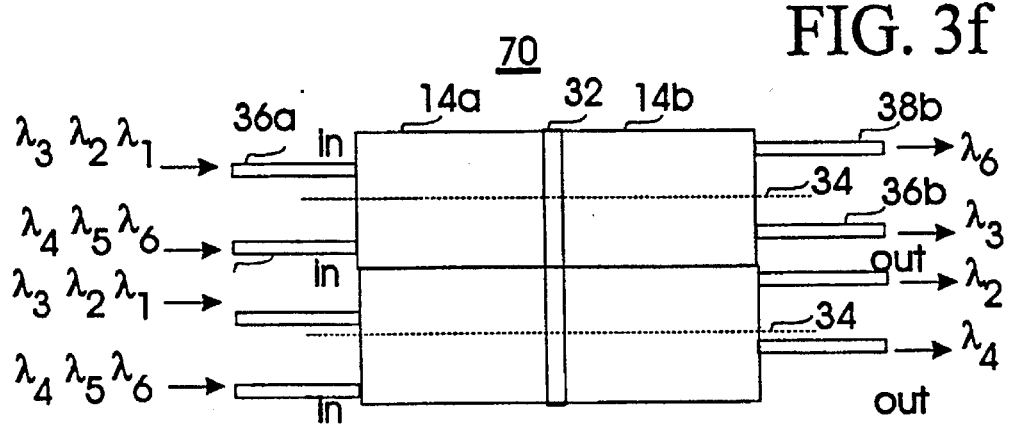
FIG. 3f is an illustration of a multi-port narrow bandpass filter in accordance with the invention.

Alternative embodiments to the basic filter of FIG. 3b, will now be described with reference to FIGS. 3c to 3f. For example, in FIG. 3c a filter 40 is comprised of the same elements as those described in FIG. 3b including two additional ports 38a and 38b. Thus, filter 40 comprises two narrow band filters in a single device. In operation a signal comprising wavelengths $\lambda_1$, $\lambda_2$, and $\lambda_3$ is launched into input port 36a. Only wavelength components of the signal centered about $\lambda_3$ are received at the output port 36b. By symmetry, when a signal having wavelength components of $\lambda_4$, $\lambda_5$, $\lambda_6$ is launched into input optical fiber 38a only wavelength components of the signal centered about and near $\lambda_6$ are received at the output port 38b. In FIG. 3d, the interference filter 32 is disposed at an angle Φ, further increasing the angle of incidence and hence further increasing the shorter range wavelength range in which the filter can be tuned. With reference to FIG. 3e, in order to lessen unwanted back reflections, the outwardly facing endfaces of the lenses 14a and 14b are angled. The endfaces of the optical fibers are polished to a complementary angle to mate with the angled endfaces of the lenses. FIG. 3f shows a multi-port multi-lensed embodiment of a filter 60, wherein two lenses which may be identical or have different characteristics are utilized with a the interference filter 32. Ganging the lenses in this manner provides a filter that is capable of separating a plurality of light into 4 separate wavelength channels.

The method of fabricating the filters described heretofore in accordance with this invention, will now be described with reference to the more basic embodiment of FIG. 3b. An optical filter 30 includes two lenses 14a and 14b coaxially positioned with a wavelength selective means 32 disposed therebetween, and two ports 36a and 36b. The ports are located on opposing sides of the optical axis 34 and substantially equidistant therefrom. Polychromatic light such as white light is launched into the optical filter 30 through the port 36a. It is angled by the lens 14a as shown at 37 so as to pass through the wavelength selective means 32 at an angle α before being received at the port 36b. The angle α is determined by the location of the ports 36a and 36b relative to the optical axis 34. The ports 36a and 36b are then moved relative to the optical axis 34 thereby changing the angle α until the desired center frequency is being received at the port 36b. The two ports 36a and 36b are then positioned so as to increase the intensity of the received light. The entire optical filter is then bound in this position with glue or another suitable binder. This fixes the frequency response of the filter to that desired.

In an alternative embodiment shown in FIG. 4, the optical filter includes two lenses which are not coaxially situated. The lens 14b is positioned such that the axis 34b is parallel to the axis 34a of the lens 14a but offset by a lateral distance. The light entering the lens 14a at the port 36a is collimated and passes through the wavelength selective means 32 at an angle α. The collimated light enters the lens 14b some distance from the wavelength selective means 32 and is focused onto the port 36b.

In a further alternative embodiment shown in FIG. 3g the optical filter includes two lenses which are dissimilar. The lenses are chosen to cooperate to provide an intended optical path. The lens 14c is a 0.75 pitch GRIN lens. The lens 14b is a 0.25 pitch GRIN lens. Thus light entering the lens 14c through the port 36a is collimated and passes through the wavelength selective means 32 at an angle α, dependent upon the location of the port 36a. The light is focused by the lens 14b onto the port 36b on a same side of the optical axis 34. In some instances this embodiment provides particular advantages. For example, it may be easier to adjust the position of two optical ports on a same side of the optical axis 34.

Of course, numerous other embodiments may be envisaged, without departing from the spirit and scope of this invention, for example, the wavelength selective means disposed between the endfaces of the two lenses may be in the form of a coating applied to one of the inwardly facing endfaces of one of the lenses.

What we claim is:

1. A method of fabricating a narrow band optical filter for passing a narrowband optical signal having a predetermined centre wavelength, comprising the steps of:

providing a first graded index lens having a substantially collimating end and a substantially focusing end;

providing a second graded index lens having a substantially collimating end and a substantially focusing end;

providing a wavelength selective means having a wavelength characteristic dependent upon on an angle of incidence between the substantially collimating ends of the first and second graded index lenses;

positioning the first and second graded index lenses such that they are disposed in a coaxial relationship so that the graded index lenses have a common optical axis;

coupling an optical waveguide to each substantially focusing end of the first and second graded index lenses, each at a location defining a port for porting a beam of light at each end face, the ports being on opposite sides of the optical axis and substantially equidistant from the optical axis;

launching an optical test signal into one of said ports through one of the optical waveguides;

allowing at least a portion of the signal to propagate through the wavelength selective means and through the lenses;

receiving the signal from the other optical waveguide at the other of said ports; and, adjusting the location of at least one of said ports to receive at least one of a maximum intensity of the received signal and the predetermined wavelength, within predetermined limits.

2. A method of fabricating a narrow band optical filter as defined in claim 1, wherein the wavelength of the optical signal launched into one of said ports is the predetermined wavelength.

3. A method of fabricating a narrow band optical filter comprising the steps of:

providing a first graded index lens having a substantially collimating end and a substantially focusing end;

providing a second graded index lens having a substantially collimating end and a substantially focusing end;

providing a wavelength selective means having a wavelength characteristic dependent upon on an angle of incidence between the substantially collimating ends of the first and second graded index lenses;

positioning the first and second graded index lenses such that they are disposed in a coaxial relationship so that the graded index lenses have a common optical axis;

coupling an optical waveguide to each substantially focusing end of the first and second graded index lenses, each at a location defining a port for porting a beam of light at each end face, the ports being on opposite sides of the common optical axis and substantially equidistant from the optical axis;

launching a narrowband signal comprising of substantially the predetermined wavelength into one of said ports through one of the optical waveguides;

allowing the signal to propagate through the wavelength selective means and through the lenses;

receiving the signal from the other optical waveguide at the other of said ports; and, adjusting the location of at least one of said ports to determine a maximum intensity of the received signal.

4. A method of fabricating a narrow band optical filter for passing a narrow band optical signal having a predetermined centre wavelength, comprising the steps of:

providing a first graded index lens having a substantially collimating end and a substantially focusing end;

providing a second graded index lens having a substantially collimating end and a substantially focusing end;

providing a wavelength selective means having a wavelength characteristic dependent upon on an angle of incidence between the substantially collimating ends of the first and second graded index lenses;

coupling an optical waveguide to each substantially focusing end of the first and second graded index lenses, each at a location defining a port for porting a beam of light at each end face;

launching an optical signal having at least the predetermined wavelength into one of said ports through one of the optical waveguides;

allowing the signal to propagate through the wavelength selective means and through the lenses;

receiving the signal from the other optical waveguide at the other of said ports;

adjusting the location of at least one of said ports until the wavelength of the received signal is the predetermined wavelength, within predetermined limits; and, affixing the waveguides in place such that they are permanently and non-movably coupled with their adjacent lenses.

* * * * *